US011392995B2

United States Patent
Ashner et al.

(10) Patent No.: US 11,392,995 B2
(45) Date of Patent: *Jul. 19, 2022

(54) EFFICIENT TRANSLATION AND LOAD BALANCING OF OPENRTB AND HEADER BIDDING REQUESTS

(71) Applicant: Engine Media, LLC, Princeton, NJ (US)

(72) Inventors: Louis Clayton Ashner, New York, NY (US); Michael Zacharski, Pawling, NY (US)

(73) Assignee: ENGINE MEDIA, LLC, Princeton, NJ (US)

( * ) Notice: Subject to any disclaimer, the term of this patent is extended or adjusted under 35 U.S.C. 154(b) by 345 days.

This patent is subject to a terminal disclaimer.

(21) Appl. No.: 16/518,121

(22) Filed: Jul. 22, 2019

(65) Prior Publication Data

US 2019/0340657 A1    Nov. 7, 2019

Related U.S. Application Data

(63) Continuation of application No. 15/485,931, filed on Apr. 12, 2017, now Pat. No. 10,360,598.

(51) Int. Cl.
*H04L 29/00* (2006.01)
*G06Q 30/02* (2012.01)
(Continued)

(52) U.S. Cl.
CPC ..... *G06Q 30/0275* (2013.01); *G06Q 30/0277* (2013.01); *H04L 29/00* (2013.01);
(Continued)

(58) Field of Classification Search
CPC .......... G06Q 30/0275; G06Q 30/0277; G06Q 30/00–30/0284; H04L 69/321; H04L 29/00; H04L 67/1002; H04L 47/125
See application file for complete search history.

(56) References Cited

U.S. PATENT DOCUMENTS 8,831,987 B2   9/2014   Knapp et al.
8,983,859 B2   3/2015   Nice et al.
(Continued)

OTHER PUBLICATIONS

J. Faizan, H. El-Rewini and M. Khalil, "Efficient dynamic load balancing for multiple home agents in Mobile IPv6 based networks," ICPS '05. Proceedings. International Conference on Pervasive Services, 2005., 2005, pp. 178-187, doi: 10.1109/PERSER.2005.1506409. (Year: 2005).*

(Continued)

*Primary Examiner* — John Van Bramer
*Assistant Examiner* — Darnell A Pouncil
(74) *Attorney, Agent, or Firm* — K&L Gates LLP

(57) ABSTRACT

Efficient translation and load balancing of bid requests is disclosed. For example, a first network interface receives a notice from a publisher and triggering a first interrupt on a first processor. The first processor processes the first interrupt and provides the notice to a notice queue. A request translator executing on a distinct second processor translates the notice into a request. A request router sends the request to an advertiser through a selected network interface, which receives a first response triggering a second interrupt on a third processor. The second processor processes the second interrupt and provides the first response to a response queue. A response translator executing on the second processor translates the first response into an offer, which is sent to the publisher through the first network interface. Meanwhile, a second network interface triggers a third interrupt on a fourth processor after receiving a second response.

19 Claims, 5 Drawing Sheets

(51) Int. Cl.
*H04L 69/321* (2022.01)
*H04L 69/00* (2022.01)
*H04L 67/1001* (2022.01)
*H04L 47/125* (2022.01)

(52) U.S. Cl.
CPC ........ *H04L 47/125* (2013.01); *H04L 67/1002* (2013.01); *H04L 69/321* (2013.01)

(56) References Cited

U.S. PATENT DOCUMENTS

| | | | |
|---|---|---|---|
| 2003/0065763 A1 | 4/2003 | Swildens et al. | |
| 2008/0065479 A1 | 3/2008 | Tomlin et al. | |
| 2008/0228564 A1 | 9/2008 | de Heer et al. | |
| 2009/0190482 A1 | 7/2009 | Blair | |
| 2010/0145809 A1 | 6/2010 | Knapp et al. | |
| 2010/0287580 A1* | 11/2010 | Harding | G06Q 30/0277 725/14 |
| 2011/0040635 A1 | 2/2011 | Simmons et al. | |
| 2011/0075582 A1 | 3/2011 | Sugiyama et al. | |
| 2012/0144023 A1 | 6/2012 | Guest et al. | |
| 2013/0066705 A1 | 3/2013 | Umeda | |
| 2013/0117427 A1 | 5/2013 | Amano et al. | |
| 2014/0025770 A1* | 1/2014 | Warfield | G06F 16/256 709/213 |
| 2014/0058849 A1 | 2/2014 | Saifee et al. | |
| 2014/0105024 A1 | 4/2014 | Yu et al. | |
| 2015/0051986 A1 | 2/2015 | Saifee et al. | |
| 2015/0112811 A1 | 4/2015 | Connors et al. | |
| 2015/0120468 A1 | 4/2015 | Knapp et al. | |
| 2015/0154650 A1 | 6/2015 | Umeda | |
| 2015/0310500 A1 | 10/2015 | Nolet et al. | |
| 2015/0319212 A1 | 11/2015 | Lida et al. | |
| 2016/0134934 A1* | 5/2016 | Jared | G06Q 30/0203 725/14 |
| 2016/0164784 A1 | 6/2016 | Amemiya et al. | |
| 2017/0093732 A1 | 3/2017 | Mohammadi | |

OTHER PUBLICATIONS

J. Linkova, Using Conditional Router Advertisements for Enterprise Multihoming (RFC 8475), Oct. 2018, p. 18 (Year: 2018).*

B. Levine, Ad Exchange bRealTime Launches Biddr+ for Header Bidding, Jan. 19, 2017.

Amazon Web Services, Advertising Serving, May 2012.

Amazon Web Services, Building a Real-Time Bidding Platform on AWS, Feb. 2016, https://d0.awsstatic.com/whitepapers/Building_a_Real_Time_Bidding_Platform_on_AWS_v1_Final.pdf.

Amazon Elastic Compute Cloud, User Guide for Linux Instances, pp. 706-721, http://docs.aws.amazon.com/AWSEC2/latest/UserGuide/ec2-ug.pdf, downloaded Mar. 21, 2017.

PCT Search Report and Written Opinion dated Dec. 14, 2017 issued for International PCT Application No. PCT/US2017/063296 filed Nov. 27, 2017.

PCT Search Report and Written Opinion dated May 11, 2018 issued for International PCT Application No. PCT/US2018/027066 filed Apr. 11, 2018.

* cited by examiner

EFFICIENT TRANSLATION AND LOAD BALANCING OF OPENRTB AND HEADER BIDDING REQUESTS

CROSS REFERENCE TO RELATED APPLICATION

The present application is a continuation of U.S. patent application Ser. No. 15/485,931, filed on Apr. 12, 2017, the entire disclosure of which is incorporated by reference herein.

BACKGROUND

The present disclosure generally relates to advertising on network accessible devices. As microprocessors have become more efficient, and network connectivity more prevalent, an ever increasing amount of devices now have internet or intranet enabled capabilities and features. With the network capabilities of network accessible devices, come opportunities for users to consume content, and therefore opportunities for publishers of content to advertise to these users. Advertisers are presented with ever increasing opportunities to reach their increasingly accessible consumers through a myriad of network accessible devices used by these consumers on a daily basis. As such, computing and networking speed typically play an important role in enabling advertisers to take advantage of opportunities to present advertisements as these opportunities arise.

SUMMARY

The present disclosure provides a new and innovative system, methods and apparatus for efficient translation and load balancing of bid requests. In an example, a load balancer system includes a first plurality of processors and a second plurality of processors distinct from the first plurality of processors, where the first plurality of processors is associated with a plurality of network interfaces and a load balancer service is associated with the second plurality of processors. The load balancer service includes a request translator, a response translator, and a request router. Each network interface of the plurality of network interfaces is assigned to a respective processor of the first plurality of processors. A first network interface receives an advertisement slot notice from a publisher. The first network interface then triggers a first interrupt on a first processor of the first plurality of processors. The first interrupt is processed by the first processor, and after processing the first interrupt, the first processor provides the advertisement slot notice to a notice translation queue. The request translator executing on the second plurality of processors translates the advertisement slot notice into an advertisement request. The request router selects either a second or a third network interface of the plurality of network interfaces, as a selected network interface to send the advertisement request to an advertiser. The request router sends the advertisement request to the advertiser through the selected network interface. The selected network interface then receives a first advertisement response and triggers a second interrupt on a second processor of the first plurality of processors. The second processor processes the second interrupt, and after processing the second interrupt, provides the first advertisement response to a response translation queue. The response translator executing on the second plurality of processors translates the first advertisement response into an advertisement offer. While the first advertisement response is being translated by the response translator, the second network interface triggers a third interrupt on a third processor of the first plurality of processors based on receiving a second advertisement response. The advertisement offer is sent to the publisher through the first network interface.

Additional features and advantages of the disclosed method and apparatus are described in, and will be apparent from, the following Detailed Description and the Figures.

DETAILED DESCRIPTION OF EXAMPLE EMBODIMENTS

Figure 1:
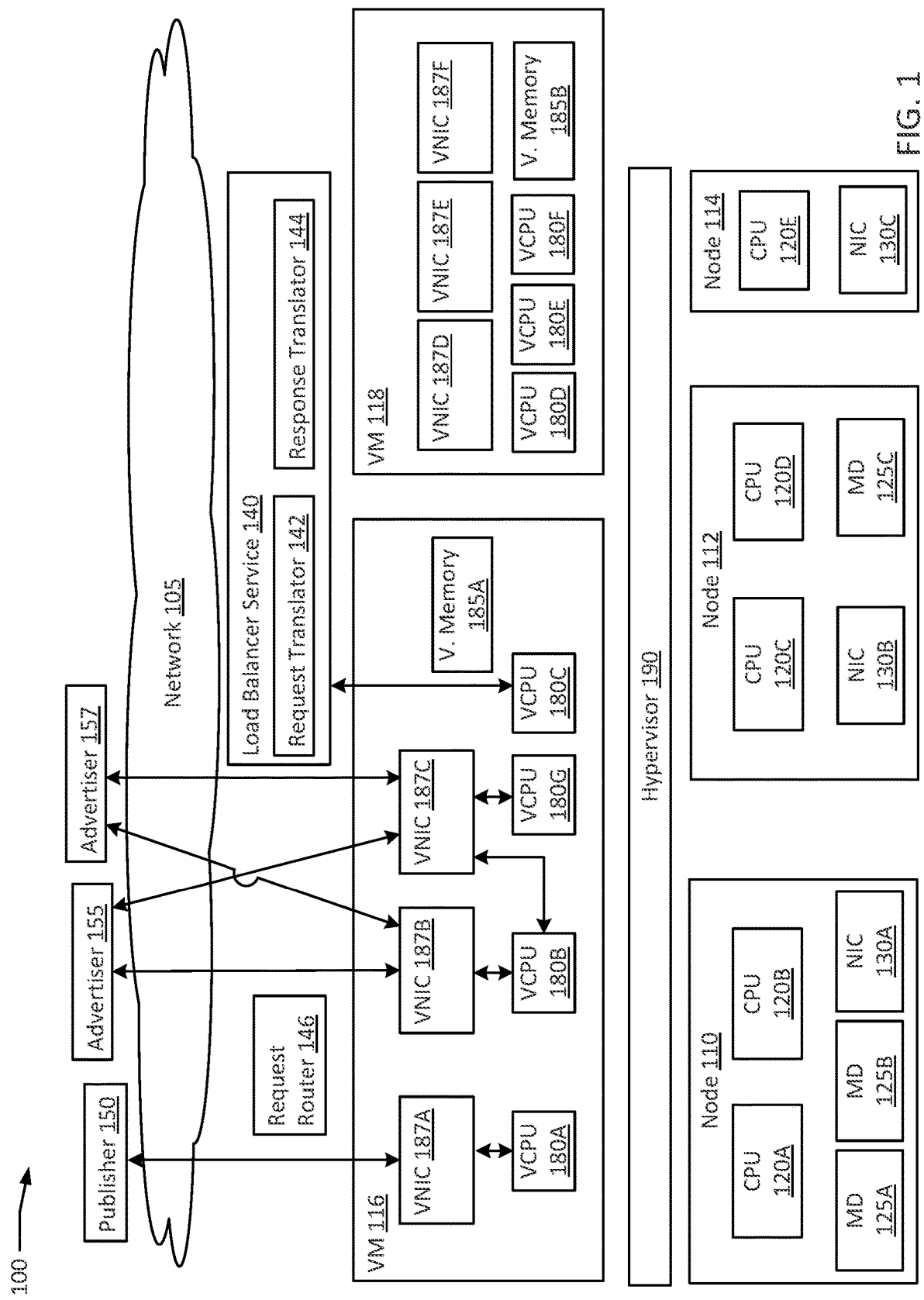
FIG. 1 is a block diagram of a system performing efficient translation and load balancing of bid requests according to an example of the present disclosure.

As network accessible devices increasingly gain popularity, opportunities to advertise on such network accessible devices increase. With the vast variety of devices capable of presenting audio and visual advertisements ("ads"), comes numerous opportunities to display ads, and also competition for the advertising opportunities or ad slots. Typically, a publisher serving content may coordinate with advertisers using a bidding process to display ads in the content, and may therefore request for bids from advertisers when an ad slot accompanying content being served becomes available. Response time may therefore be critical for maximizing both the likelihood of securing an ad slot as well as the effectiveness of a given ad slot. As users typically expect perceivably immediate responses when accessing content online, the entire process for negotiating, selecting, and displaying an ad may typically be completed in under one second. In a typical day, billions of ads may be served to consumers on network accessible devices. To handle these requests for ads, publishers, ad agencies, and/or advertisers may typically implement load balancers to distribute network traffic to individual nodes to handle individual requests.

In a typical advertising exchange implementation, a user on a network accessible device may access content supplied by a publisher. The publisher may incorporate ads in the content, and seek prospective buyers for the ads in the content in real-time while the content is loading by broadcasting an ad request for each ad slot. An ad agency may, upon receipt of a request to bid on a given ad slot, seek advertisers either directly or through an advertising exchange to purchase the ad slot. For example, header bidding may be a typical implementation by which publishers and ad agencies request bids for and subsequently serve advertisements. A typical header bidding implementation may be based on the open source project Prebid.js where a typical request for bids on an ad slot may be in the form of a hypertext transfer protocol ("HTTP") GET request with query string parameters related to the particular ad slot, such as a tag id, a referrer, and a size of the ad impression. For example, a header bid request may be in the form of a Uniform Resource Locator ("URL") without an additional message payload such as, http://www.example.com/getBid?tagid=55&referrer=mysite.com&width=300&height=250. In an example, an HTTP header associated with a request may include additional information pertinent to the request, such as User Agent, Content Type, Content Length, etc. In an example, requests for bids on an ad slot may also be in the form of an HTTP POST request. For example, in implementations based on the open source project OpenRTB, a bid may be in the form of an HTTP POST request with a JavaScript Object Notation ("JSON") payload. A typical JSON payload for an ad slot bid may include attribute-value pairs conveying information regarding the particular ad slot, such as, {"tagid"; "55", "referrer": "mysite.com", "dimensions": {"width": "300", "height": "250"}}. In various examples, different publishers and advertisers may implement different preferred formats of advertisement requests.

In an example, to maintain a positive user experience for the content, a publisher may require response within a certain critical time threshold. In an example, network latency may account for a significant proportion of the time spent handling a given request. Another significant source of latency may be the time a downstream actor (e.g., an advertiser seeking to advertise through an ad exchange) takes to respond to a given request. Some sources of latency may typically be outside of the control of a given actor.

A typical server may be limited in the number of network connections it may maintain with other target computer systems (e.g., servers, devices, and/or endpoint devices) across a network based on, for example, an availability of ports with which to establish these connections. In a typical example, a given network connection may require a handshaking process that may be required to navigate several internal system queues before an initial handshake message is even sent, and several messages generally need to be exchanged to establish a secure network communication session. For example, a request may generally originate from software requiring a network connection, the software's request may be queued by the operating system to be packaged for a network interface such as a network interface card ("NIC"), the NIC may then put the request into an outgoing queue before being sent. The NIC and a given target server may then perform a multi-step handshake to authenticate encryption keys, each leg of which incurs the full transmission latency between the NIC and the target server (e.g., at least 3 messages transmitted for a secure socket layer ("SSL") connection). Upon successful handshake, each message is then queued by each layer of the system once again before the software sees the response (e.g., NIC receiving queue, system queue, and software queue). In all, a brand new connection could easily take 100 ms-200 ms to establish, even where servers are located relatively close to each other. Therefore, it may be advantageous for network connections to be established and held open as long as possible to reduce incidences of incurring the startup costs for a new connection.

A typical network connection may be established by and between two servers, each of which is identifiable through a unique Internet Protocol ("IP") address, which may be a sequence of delimited numerical or hexadecimal digits. For example, IPv4 addresses are typically in the form of four 8-bit digits (e.g., 0-255) delimited by periods (e.g., 255.255.255.0). Meanwhile, IPv6 addresses are typically in the form of eight groups of four hexadecimal digits, each group consisting of 16 bits and separated by colons (e.g., ffff:fiff:ffffffff:ffff:ffff:ffff:0). In various other examples, any form of uniquely identifiable address may be used to direct messages between two servers, for example, a Media Access Control ("MAC") address. In a typical example, a company such as an advertiser may have its network facing systems represented by a URL where the IP address of individual servers is hidden behind a domain name and host name representative of the company (e.g., www.enginegroup.com). A Domain Name System ("DNS") may typically be queried by a network interface to resolve a host name URL into an IP address. One advantage is that servers may be interchangeably substituted for each other by updating the DNS without interrupting the availability of the host name URL (e.g., www.enginegroup.com). However, for purposes of routing requests where milliseconds are significant, a query to DNS to resolve a host name URL may take upwards of 10 ms, typically a similar amount of time to sending a message directly to a known IP address. In addition, a company such as an advertiser or ad agency may host dozens, even hundreds or thousands of servers behind a given host name URL, with each individual server potentially offering significantly different performance characteristics. For example, a particular server may be undergoing routine maintenance or running a backup slowing down responses. Multiple servers behind the same host name URL may also be located in different cities or data centers and therefore response latency may be significantly different due to physical proximity.

In a typical example, an ad agency may receive a request for a bid for an advertisement in the form of an ad slot notice from a publisher, and then distribute the ad slot notice to many potential advertisers (e.g., up to a few dozen advertisers for a given ad slot notice). In an example, an ad slot notice may be formatted in any suitable format (e.g., HTTP GET requests, HTTP post requests). In the example, each advertiser requires a separate connection and a separate message sent, often times with slight variations in formatting. Therefore, in a load balancer operated by the ad agency to send out ad requests to advertisers to solicit bids on a given ad slot, translation may be performed on the publisher's original ad slot notice, and a large number of connections may be maintained with numerous publishers as well as numerous advertisers. In many examples, the number of network connections a computer system may maintain simultaneously is limited by the network interfaces in the computer system. For example, there may be a maximum number of connections that a given network interface may maintain (e.g., based on IP address and port limitations). In an example, each publisher and/or advertiser may have dozens, hundreds, even thousands of network interfaces handling requests. In the example, an ad agency may maintain active connections to as many of these numerous network interfaces for each publisher and/or advertiser as possible for purposes of redundancy and/or performance, resulting in an exponential number of connections maintained.

A typical system for a load balancer (e.g., for an ad agency acting as a facilitator between publishers and advertisers), may include a group of servers facing publishers, receiving ad slot requests and responding with advertiser offers. This group of publisher facing servers may be connected to a larger group of servers that face advertisers, the advertiser facing servers translating ad slot requests into formats compatible with each advertiser, and connecting to the advertisers to send ad requests and receive ad responses from the advertisers. A split setup may be necessitated by limitations on open connections for a given system. For example, a typical setup may be a ratio of one publisher facing server for every ten advertiser facing servers. A disadvantage of such a system may be network latency between the publisher facing systems and the advertiser facing systems, as well as the maintenance overhead of a large number of servers all requiring updates and synchronization.

In the example system, adding multiple network interfaces to one server may allow the server to maintain more active connections. For example, adding ten NICs to the publisher facing server may allow the server to maintain the required connections to both publishers and advertisers. In a typical example, request and response translation may not come near to fully utilizing the processing capacity of an advertiser facing server in a split setup. Therefore, request and response translation may also fit under the processing capacity of a large server with ten or more NICs. However, receiving messages over a network interface may typically trigger an interrupt on a processor handling output from the network interface. An interrupt may typically be a high priority request that displaces and puts on hold the current processing of the processor (e.g., by executing a context switch). With billions of ads served daily, and with an exponential number of requests for bids to advertisers, each request and/or response triggering an interrupt may effectively lock up the load balancer system, resulting in an interrupt storm type of event freezing the system. The interrupt storm type events were typically compounded during periods of high traffic and high demand, typically resulting in a counter productive scenario where output decreased as demand increased. To reduce the number of interrupts, network interfaces may typically be configured to queue messages before sending the messages in bulk to a processor as one interrupt. However, where such queues overflow, messages may be lost. In addition, implementing an aggressive delay to create larger packets of messages may reclaim much of the potential gains in latency resulting from implementing additional NICs. Therefore, many typical load balancer systems employ a split layer system with additional, underutilized, servers to maintain network connections (e.g., with advertisers) since combining servers to reduce latency and raise processor utilization for request translation may typically very quickly become counterproductive as requests and/or responses handled by any one system increase.

The present disclosure aims to address the interplay between networking and processor utilization to increase efficiency while reducing latency in load balancer systems for advertisement requests (e.g., header bidding systems and other real-time bidding systems). In a typical example, a publisher may configure the ad slots in the publisher's content to display an ad 1 s-1.5 s after the content is requested, and may therefore allow 500 ms-1 s for bids from advertisers to be received after the content is requested. In the example, it may be advantageous for an ad agency acting as a middleman to minimize the latency added through the ad agency's systems (e.g., a load balancer and/or routing system) to maximize the time given to advertisers and/or network latency to respond to a request, thereby increasing the proportion of ad slots responded to in a timely manner. In an example, adding an internal connection between a system interfacing with publishers to a collection of systems interfacing with advertisers and translating requests and/or responses may typically add 10 ms in latency to each leg of a request and response cycle. In an example, by compressing a load balancer system into one server along with optimized request translation as disclosed herein, 20 ms-50 ms in latency may be eliminated from a typical request and response cycle providing for significant overhead for additional delays to or from an advertiser, or by the advertiser out of a 500 ms time window. In an example, optimized interrupt handling allows for the addition of ten, potentially even up to one hundred network interfaces to a load balancer server to handle maintaining connections to a large number of publishers and advertisers without slowing and/or stalling request translation. In various embodiments, an average request/response cycle of 200 ms-250 ms saw improvements resulting in average request/response cycles of 150 ms-200 ms, a 20%-25% improvement as a result of implementing efficient translation and load balancing of header bidding and real-time bidding requests. In a typical example, total improvements of up to 50 ms may be a cumulative result from enhanced advertiser response time based on translating requests into an optimized form and collapsing a two layer load balancer system into one layer of servers. In an example, 90% of the servers in a two layer load balancer system may be eliminated resulting in significant operating and maintenance overhead savings (e.g. reduced power consumption, reduced heat, reduced foot print, increased portability, reduced physical hardware capacity, and feasibility of multiregional deployment).

FIG. 1 is a block diagram of a system performing efficient translation and load balancing of bid requests according to an example of the present disclosure. In an example, efficient translation and load balancing of bid requests in system 100 may be performed by load balancer service 140, including a request translator 142 and a response translator 144, in conjunction with request router 146. In an example, load balancer service 140 including routing request translator 142, response translator 144, and/or request router 146 may execute on a virtual machine ("VM") 116 that is hosted by a hypervisor 190 which executes on one or more of a plurality of hardware nodes (e.g., nodes 110, 112, and 114). In the example, VM 116 including load balancer service 140 may connect to target nodes over network 105 through virtual network interfaces ("VNICs") 187A, 187B, and 187C. In an example, VM 118 may host similar services to load balancer service 140.

In an example, network 105 may be any type of network, for example, a public network (e.g., the Internet), a private network (e.g., a local area network (LAN) or wide area network (WAN)), or a combination thereof. In an example, devices connected through network 105 may be interconnected using a variety of techniques, ranging from a point-to-point processor interconnect, to a system area network, such as an Ethernet-based network. In an example, load balancer service 140 including routing request translator 142, response translator 144, and/or request router 146 may execute on any virtualized or physical hardware connected to network 105. In an example, load balancer service 140 including routing request translator 142, response translator 144, and/or request router 146 executes on VM 116 which executes on nodes 110, 112 and/or 114. The system 100 may include one or more interconnected hosts (e.g., nodes 110, 112 and 114). Each nodes 110, 112 and 114 may in turn include one or more physical processors (e.g., CPU 120A-E) communicatively coupled to memory devices (e.g., MD 125A-C) and network interfaces (e.g., NIC 130A-C). As used herein, physical processor or processors (Central Processing Units "CPUs") 120A-E refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 125A-C refers to a volatile or non-volatile memory device, such as RAM, ROM, EEPROM, or any other device capable of storing data. Each node may also include input/output ("I/O") devices capable of providing an interface between one or more processor pins and an external device, the operation of which is based on the processor inputting and/or outputting binary data. CPUs 120A-E may be interconnected using a variety of techniques, ranging from a point-to-point processor interconnect, to a system area network, such as an Ethernet-based network. In an example, NICs 130A-C may be physical network interfaces capable of connecting each of nodes 110, 112, and 114 to another device, either a physical node (e.g., nodes 110, 112, or 114) or a virtual machine (e.g., VMs 116 and 118). In an example NICs 130A-C may allow nodes 110, 112, and 114 to interconnect with each other as well as allowing nodes 110, 112, and 114 as well as software executing on the nodes (e.g., load balancer service 140 including routing request translator 142, response translator 144, and/or request router 146) to connect to remote systems such as target nodes over network 105. Local connections within each of nodes 110, 112 and 114, including the connections between a processor 120A and a memory device 125A-B and between a processor 120A and a NIC 130A may be provided by one or more local buses of suitable architecture, for example, peripheral component interconnect (PCI). In an example, NICs 130A-C may be virtualized as virtual network interfaces 187A-D. For example, physical NIC 130A may act as a relay for a message to or from virtual network interface 187A, with virtual network interface 187A having a different IP address from NIC 130A. In an example, each physical NIC may support multiple virtual network interfaces. In an example, VM 116 may have eight, sixteen or even more virtual network interfaces. In an example, VNIC 187A may be configured to primarily communicate with publishers (e.g., publisher 150), while VNIC 187B may be configured to primarily communicate with advertisers (e.g., advertisers 155 and 157). For example, VNIC 187A may be a public address for VM 116 reachable through DNS, while VNIC 187B may be associated with an IP address that is not publically listed, but rather only communications along a previously established connection would typically reach VNIC 187B. In an example, VNIC 187C may be configured to connect to advertisers 155 and 157 and may also be assigned to VCPU 180B. In another example, VNIC 187C may be assigned to a different VCPU from VCPU 180B and VCPU 180C. In an example, VCPU 180B may represent a plurality of CPU cores. In an example, VNIC 187B and VNIC 187C may be assigned to different cores of VCPU 180B.

In computer systems (e.g., system 100), it may be advantageous to scale application deployments by using isolated guests such as virtual machines and/or containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications as well as isolate other parts of system 100 from potential harmful code executing within any one virtual machine. In an example, a VM may be a robust simulation of an actual physical computer system utilizing a hypervisor or a component (e.g., a virtual machine manager) that executes tasks commonly executed by hypervisors to allocate physical resources to the virtual machine. In an example, VMs 116 and 118 may be virtual machines executing on top of physical hosts (e.g., nodes 110, 112 and 114), possibly with a hypervisor 190 executing between the virtualized layer and the physical hosts. In an example, load balancer service 140, routing service 141, and/or latency service 142 may be further virtualized (e.g., in a container).

In an example, VMs 116 and 118 may represent separate load balancer systems, e.g., VM 116 may host load balancer service 140 handling the requests of publishers including publisher 150, while VM 118 may host a separate load balancer service configured to handle the requests of other publishers. In another example, a load balancer service executing on VM 118 may be functionally identical to load balancer 140 and incoming requests may be routed to either VM 116 or VM 118 (e.g., by DNS) or incoming requests may be allocated between VMs 116 and 118 based on any suitable system including but not limited to a random distribution and/or a round robin distribution.

System 100 may run one or more VMs 116 and 118, by executing a software layer (e.g., hypervisor 190) above the hardware and below the VMs 116 and 118, as schematically shown in FIG. 1. In an example, the hypervisor 190 may be a component of a host operating system executed by the system 100. In another example, the hypervisor 190 may be provided by an application running on the host operating system, or may run directly on the nodes 110, 112, and 114 without an operating system beneath it. The hypervisor 190 may virtualize the physical layer, including processors, memory, and I/O devices, and present this virtualization to VMs 116 and 118 as devices, including virtual processors ("VCPU") 180A-F, virtual memory devices 185A-B, and virtual network interfaces 187A-D.

In an example, a VM 116 may be a virtual machine and may execute a guest operating system which may utilize the underlying virtual central processing unit ("VCPUs") 180A-C and 180G, virtual memory device ("V. Memory") 185A, and virtual network interfaces 187A-B. Load balancer service 140 including routing request translator 142, response translator 144, and/or request router 146 may run as applications on VM 116 or may be further virtualized and execute in containers. Processor virtualization may be implemented by the hypervisor 190 scheduling time slots on one or more physical processors 120A-E such that from the guest operating system's perspective those time slots are scheduled on a virtual processors 180A-C and 180G. In an example, each of VCPUs 180A-C and 180G may be bound to execute on a separate physical processor in nodes 110, 112, and 114. For example, instructions for VCPU 180A may execute on CPU 120A, instructions for VCPU 180B may execute on CPU 120B, and instructions for VCPU 180C may execute on CPU 120C. In an example, VCPUs associated with VNICs (e.g., VCPU 180A associated with VNIC 187A, and VCPU 180B associated with VNIC 187B) may execute on one physical processor or group of physical processors (e.g., CPU 120A) while VCPUs associated with request translator 142 and/or response translator 144 may send instructions to a separate physical CPU (e.g., CPU 120B).

A VM 116 may run on any type of dependent, independent, compatible, and/or incompatible applications on the underlying hardware and host operating system. In an example, load balancer service 140 including routing request translator 142, response translator 144, and/or request router 146 running on VM 116 may be dependent on the underlying hardware and/or host operating system. In another example, load balancer service 140 including routing request translator 142, response translator 144, and/or request router 146 running on VM 116 may be independent of the underlying hardware and/or host operating system. In an example, load balancer service 140 including routing request translator 142, response translator 144, and/or request router 146 running on VM 116 may be compatible with the underlying hardware and/or host operating system. Additionally, load balancer service 140 including routing request translator 142, response translator 144, and request router 146 may be incompatible with the underlying hardware and/or OS. In an example, load balancer service 140 including routing request translator 142, response translator 144, and/or request router 146 may be implemented in any suitable programming language (e.g., Java, C, C++, C-sharp, Visual Basic, structured query language (SQL), Pascal, common business oriented language (COBOL), business process execution language (BPEL), business process model notation (BPMN), complex event processing (CEP), jBPM, Drools, etc.). The hypervisor 190 may manage memory for the host operating system as well as memory allocated to the VM 116 and guest operating systems. In an example, VM 118 may be another virtual machine similar in configuration to VM 116, with VCPUs 180D-F, virtual memory 185B, and virtual network interfaces 187D-F operating in similar roles to their respective counterparts in VM 116.

Figure 2:
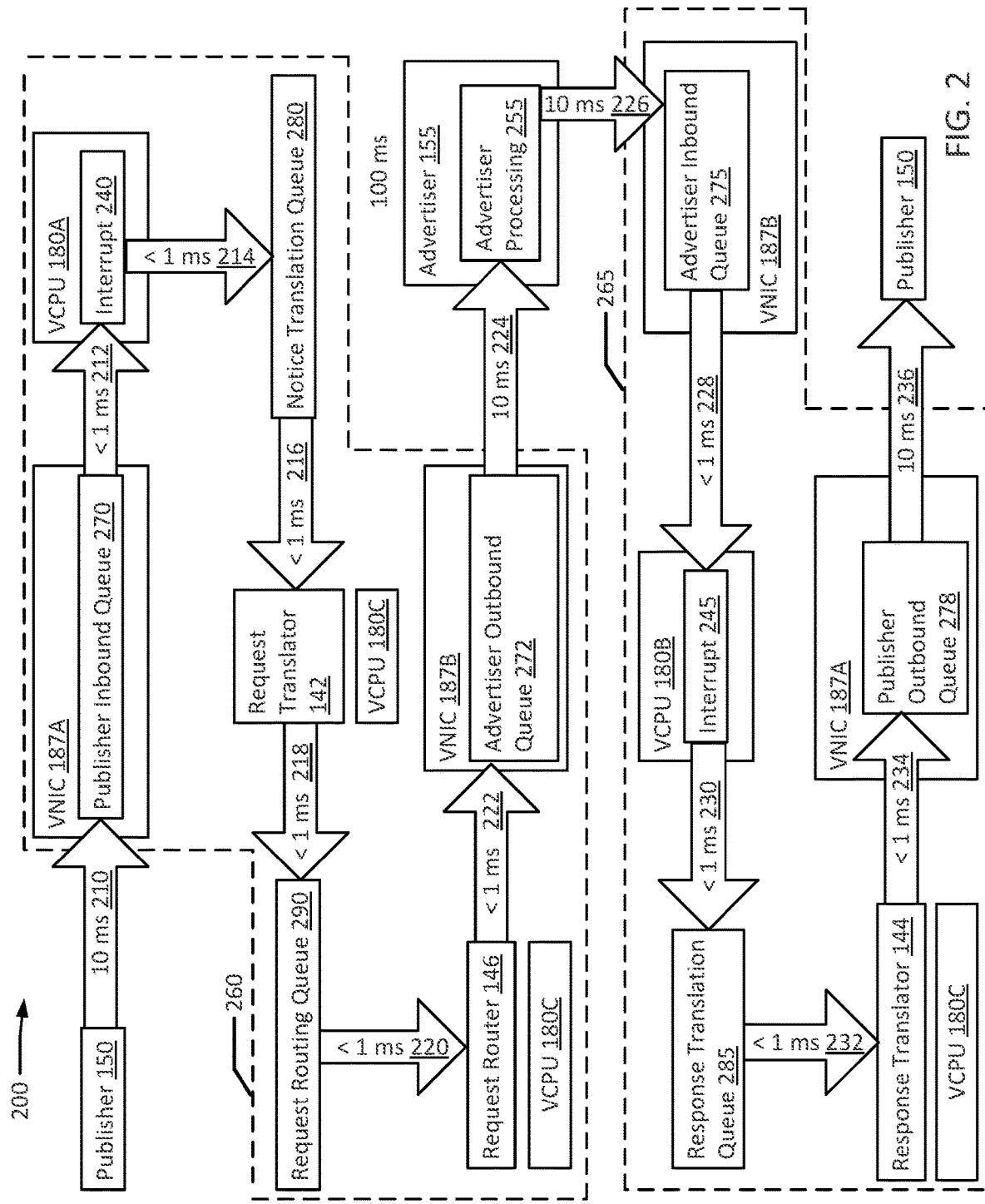
FIG. 2 is a block diagram of message flow through a system performing efficient translation and load balancing of bid requests according to an example of the present disclosure.

FIG. 2 is a block diagram of message flow through a system performing efficient translation and load balancing of bid requests according to an example of the present disclosure. System 200 as illustrated in FIG. 2 shows an entire request/response cycle following one ad slot notice arriving from publisher 150 all the way through an ad offer being sent back to publisher 150. In an example, system 200 may include two groupings of components illustrated in FIG. 2 with dotted lines corresponding with two typical directions of message flow. For example, component group 260 may be the route in the advertisement request/response cycle that handles a request (e.g., ad slot notice and ad request) to an advertiser (e.g., advertiser 155) from a publisher (e.g., publisher 150). In the example, component group 265 may be the return route in the advertisement request/response cycle that handles a response (e.g., ad response and ad offer) back to the publisher (e.g., publisher 150) from the advertiser (e.g., advertiser 155).

In an example, an ad slot notice from publisher 150 takes roughly 10 ms to reach VM 116 over network 105 going into component group 260 (block 210). In an example, the ad slot notice may be a header bidding request (e.g., an HTTP GET request). In another example, the ad slot notice may be a real-time bidding request (e.g., an HTTP POST request). In an example, a physical location for hosting VM 116 may be optimized for the publishers served by VM 116 and/or for advertisers connected with VM 116. An optimal location may be selected for VM 116 to minimize latency both to publisher 150 and advertiser 155. In an example, VNIC 187A on VM 116 receives the ad slot notice in a publisher inbound queue 270. In the example, one or more ad slot notices may be queued in publisher inbound queue 270 prior to being transferred to VCPU 180A for processing, for example, to store the ad slot notice in local memory (e.g., virtual memory 185). In an example, the queuing and transfer of the ad slot notice takes less than 1 ms (block 212). In the example, VCPU 180A may process the ad slot notice as an interrupt 240, and may execute a context switch to process interrupt 240. For example, if VCPU 180A was processing non-network data, a context switch to receive the ad slot notice may take upwards of 100 µs. In an example, processing the ad slot notice as interrupt 240 and adding the ad slot notice to a notice translation queue 280 takes under 1 ms (block 214). In an example, a request translator 142 executing on VCPU 180C may retrieve the ad slot notice from notice translation queue 280 in under 1 ms (block 216). Request translator 142 may then translate the ad slot notice into an ad request in under 1 ms and deliver the ad request to a request routing queue 290 (block 218). In an example, pre-translating the ad slot notice (e.g., request translator 142 translating the ad slot notice into the ad request) may typically save 1 ms-10 ms from advertiser processing 255 and network transfer 224. A request router 146 may then retrieve the ad request from request routing queue 290 in under 1 ms (block 220). In an example request router 146 may execute on VCPU 180C as well. In the example, request router 146 may select VNIC 187B to send the ad request to advertiser 155 by sending the ad request to an advertiser outbound queue 272 in VNIC 187B in under 1 ms (block 222). In an example, VNIC 187B may send the contents of advertiser outbound queue 272 including the ad request to advertiser 155, such a transfer generally taking around or upwards of 10 ms (block 224). In an optimized example, all of the processing and transfers in component group 260, which represents the request handling components of system 200, may occur in under 1 ms cumulatively. In the example, each of the queues may allow for temporary backlogs to smooth request handling. For example, request translation (e.g., as represented in block 218) may typically take 100 µs-300 µs.

In contrast, in a split layer system with separate groups of servers (e.g., one group facing publishers and a second group facing advertisers), the tasks executed by component group 260 would typically be split between servers. For example, rather than VCPU 180A placing the ad slot notice onto notice translation queue 280 at block 214, a processor on a split layer system may receive the ad slot notice on a publisher facing server, then immediately route the ad slot notice to an advertiser facing server for translation. In the example, 5-10 ms of network latency may typically be observed for the additional network transfer. Also, an additional interrupt may be required (e.g., when the advertiser facing server receives the forwarded ad slot notice). In an example, by keeping translation and advertiser side communications on the same server as publisher side communications, perceived request handling times may be decreased 10× to 30×, for example, from 10 ms to 25 ms down to under 1 ms. In an example, diverting network generated interrupts away from VCPU 180C may aid in realizing the substantial networking related efficiency gains. For example, if interrupt 240 were to occur on VCPU 180C rather than VCPU 180A, a context switch on VCPU 180C in the middle of a translation may double the time request translator 142 spends converting the ad slot notice into an ad request (e.g., from 100 µs to 200 µs or more).

In an example, advertiser 155 may send the ad request through internal processing (e.g., advertiser processing 255) to determine a bid on the ad slot represented by the ad slot notice. In an example, advertiser processing 255 typically takes over 100 ms, to generate an ad response to the ad request. In an example, upwards of 10 ms of network latency may be observed for transferring the ad response back to VM 116 (block 226). In an example, VNIC 187B receives the ad response in advertiser inbound queue 275 and packages the ad response with other responses received with similar timing to then send to VCPU 180B to be processed as an interrupt 245, the queuing and transferring typically completed in under 1 ms (block 228). After processing interrupt 245, the ad response may be sent by VCPU 180B to response translation queue 285 in under 1 ms (block 230). In an example, response translator 144 executing on VCPU 180C may retrieve the ad response from response translation queue 285 in under 1 ms (block 232). Response translator 144 may then translate the ad response into an ad offer and place the ad offer in a publisher outbound queue 278 in under 1 ms (block 234). In the example, VNIC 187A may then send the contents of publisher outbound queue 278 to publisher 150 in a network transfer that may take around or upwards of 10 ms (block 236). In an optimized example, all of the processing and transfers in component group 265 representing the response handling components of system 200 may occur in under 1 ms cumulatively. In the example, each of the queues may allow for temporary backlogs to smooth request handling. For example, response translation (e.g., as represented in block 234) may typically take 100 μs-300 μs.

In contrast, in a split layer system with separate groups of servers (e.g., one group facing publishers and a second group facing advertisers), the tasks executed by component group 265 would typically be split between servers. For example, rather than VCPU 180B placing the ad response into response translation queue 285 at block 230, a processor on a split layer system may receive the ad response on an advertiser facing server, then immediately route the ad response to a publisher facing server for translation. In the example, 5-10 ms of network latency may typically be observed for the additional network transfer. In addition, an additional interrupt may be required (e.g., when the publisher facing server receives the forwarded ad response). In an example, by keeping translation and advertiser side communications on the same server as publisher side communications, perceived request handling times may be decreased 10× to 30×, from 10 ms to 25 ms down to under 1 ms. In an example, diverting network generated interrupts away from VCPU 180C may aid in realizing the substantial networking related efficiency gains. For example, if interrupt 245 were to occur on VCPU 180C rather than VCPU 180B, a context switch on VCPU 180C in the middle of a translation may double the time response translator 144 spends converting the ad response into an ad offer (e.g., from 100 μs to 200 μs or more). In an example, each ad slot notice may be translated into a dozen or more ad requests (potentially even hundreds of ad requests) to be sent to different advertisers. In the example, the ad responses received by VNIC 187B may become an interrupt storm stalling translation by request translator 142 and/or response translator 144. In an example, a sufficient quantity of interrupts may render a system unresponsive and/or crash the system. A typical average translation time may well be multiplied by a factor of 2× to 10× from the 100 μs range to upwards of 1 ms if interrupts from VNIC 187B occurred on the same processor as translation. Therefore, diverting interrupts from VNIC 187B away from VCPU 180B may result in time savings of upwards of 90% on request and response translation.

In an example, in a split layer system with separate publisher and advertiser facing servers, the equivalents of VCPU 180A and VCPU 180B may necessarily be different processors since one is on a publisher facing server and the other is on an advertiser facing server. In the example, a processor on a publisher facing server may also perform request and/or response translation. Another processor on an advertiser facing server may also perform request and/or response translation. In both cases, the effect of a context switch adding 100 μs of latency to a request and/or response translation may well be hidden by the addition of 5 ms-10 ms of network latency. Additionally, by maintaining, for example, a ratio of ten advertiser facing servers to one publisher facing server, interrupts may be distributed enough between the servers to avoid sufficient frequency to flood the processors on the servers. However, in a system employing efficient translation and load balancing of bid requests, component parts 260 and 265 each typically execute their tasks in under one ms total. To maintain the speed advantage for translation and routing, interrupts on translation may need to be avoided. In an example, a system may be configured with universal network interfaces (e.g., VNICs 187A-C all communicate with both publishers and advertisers). In the example, VNICs 187A-C may be configured to send inputs to VCPUs 180A, 180B, and/or 180G interchangeably, so long as network traffic handling is isolated away from VCPU 180C performing translation. In an example, where sufficient processing capacity allows, VCPU 180A and VCPU 180B may both be configured for processing input from multiple VNICs including VNICs 187A, 187B, and/or 187C. In an example VCPU 180A may be configured to handle network interrupts from both publisher ad slot notices as well as advertiser responses. In an example, VNICs 187A-C may be configured to connect to publishers and/or advertisers interchangeably. In an example, VNIC 187C may be configured to take over publisher communications from VNIC 187A (e.g., via a DNS hostname failover) in the event of an outage of VNIC 187A. In the example, VNIC 187C may continue sending network traffic to VCPU 108B and/or VCPU 180G for processing and interrupt handling. In another example, VNIC 187C may switch to VCPU 180A for processing network traffic and interrupt handling when VNIC 187C switches over to handling publisher based network traffic.

Figure 3:
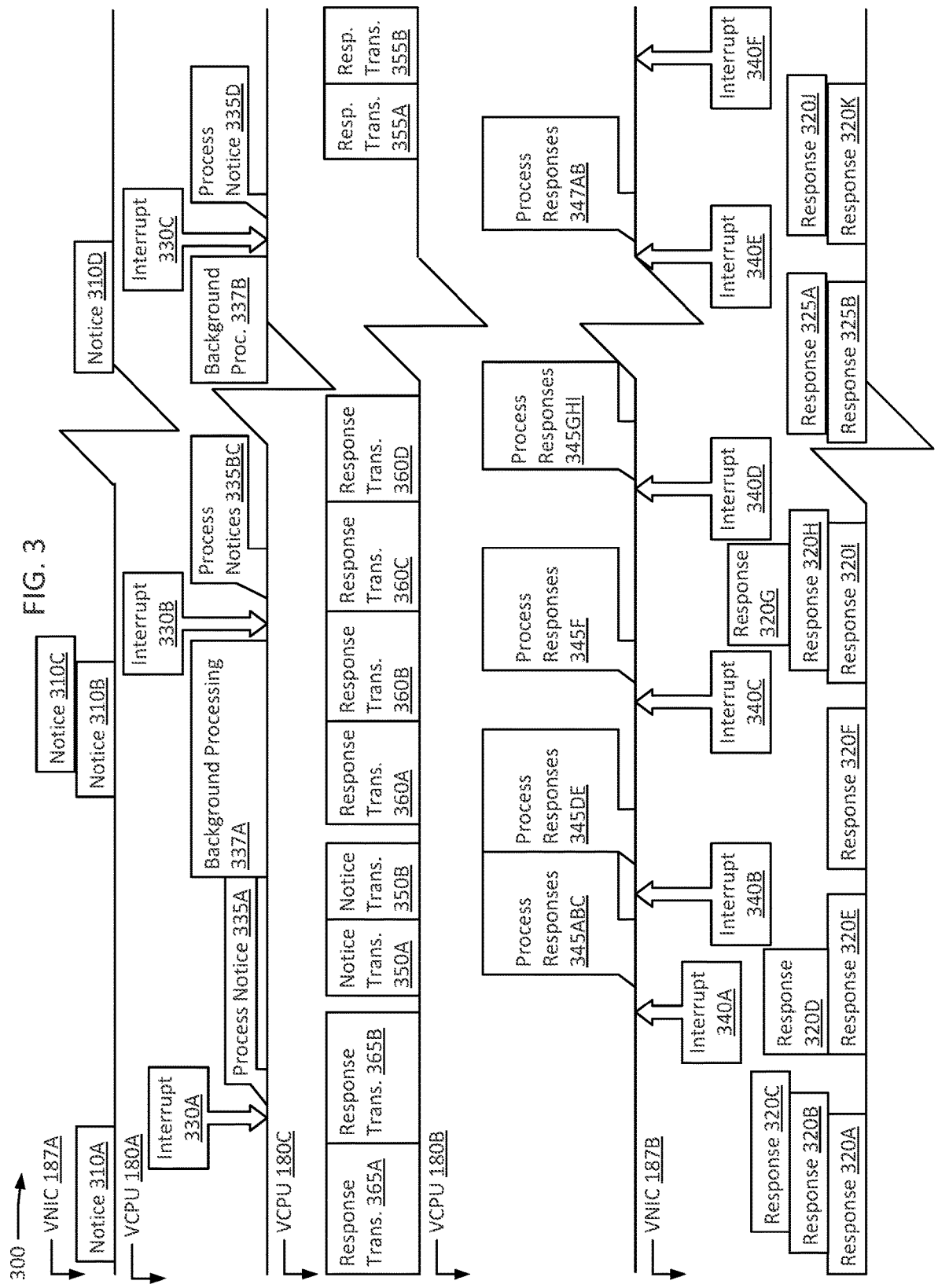
FIG. 3 is a timing diagram of request handling by components of a system performing efficient translation and load balancing of bid requests according to an example of the present disclosure.

FIG. 3 is a timing diagram of request handling by components of a system performing efficient translation and load balancing of bid requests according to an example of the present disclosure. System 300 illustrates a time line, with time progressing from left to right, of VM 116 handling a plurality of notices from publishers. In an example, VCPU 180C may be configured to execute both the request translator 142 and the response translator 144. In an example, VCPU 180C may execute with typical translation contexts preloaded into processor cache and process a continuous or nearly continuous stream of translations. In an example, VNIC 187A may receive notice 310A while VCPU 180C is processing response translation 365A from a previous request/response cycle, and VNIC 187B is receiving responses 320A-C from a previous request/response cycle. In an example, notice 310A triggers interrupt 330A in VCPU 180A, which then processes interrupt 330A (e.g., process notice 335A). In an example, after processing notice 310A, VCPU 180A may have a period free from networking related processing to handle routine background processing 337A tasks for system 300. In an example, while VCPU 180A is handling interrupt 330A, VCPU 180C may be performing response translation 365B for a different ad response, which would have been interrupted and delayed if interrupt 330A occurred on VCPU 180C rather than VCPU 180A. In an example, after processing response translation 365B, VCPU 180C retrieves ad notice 310A from a request translation queue and translates the ad notice 310A twice for two different advertisers in notice translations 350A and 350B. Simultaneously, VNIC 187B may detect a gap in incoming traffic and package responses 320A-C into one package triggering interrupt 340A on VCPU 180B. VCPU 180B may then process responses 320A-C in process responses 345ABC. In an example, a response to notice 310A may not be expected in the detailed timescale illustrated in FIG. 3. For example, interrupt handling and translation may take 100 μs-300 μs, while waiting for a response to notice 310A from an advertiser may take 100 ms-200 ms. A breakage in time is therefore indicated in FIG. 3 to show the a response cycle to notice 310A.

In an example, ad requests resulting from notice translations 350A-B may be sent through VNIC 187B to two different advertisers (e.g., advertisers 155 and 157). Meanwhile, VCPU 180C may begin translating responses 320A-C in response translations 360A-C. In the example, if interrupt 340A had occurred on VCPU 180C, notice translations 350A-B would have been delayed and response translations 360A-C could not have started yet. In the example, while VCPU 180C is executing response translations 360 A-C, VCPU 180A may be performing background processing 337A which is interrupted due to VNIC 187A receiving ad notices 310B-C resulting in interrupt 330B on VCPU 180A. VCPU 180A may then execute to process interrupt 330B as process notices 335BC before resuming background processing in background processing 337B. Meanwhile, additional responses 320D-E may be received by VNIC 187B, triggering interrupt 340B on VCPU 180B, which executes to process responses 320D-E in process responses 345DE. In an example, a context switch may be unnecessary where the previous processing task of the VCPU was to handle a similar interrupt (e.g., between interrupts 340A and 340B). VNIC 187B may additionally receive response 320F triggering interrupt 340C on VCPU 180B, which executes to process responses 320F in process responses 345F. In an example, responses 320A-K may all be responses to the same ad notice from earlier (e.g., from different advertisers). In another example, responses 320A-K may be responses to a plurality of earlier notices. For example, responses 320B and D may be late responses to a first notice responses 320A, F, G, H, I and J may be responses to a second notice after the first notice, and responses C, E, and K may be responses to a third notice. In an example, response 320D may be a response to a notice near timing out, and a delay in translation (e.g., due to a plurality of interrupts on VCPU 180C) may have delayed response 320D past a time limit for responding, resulting in a lost opportunity. In the example, response 320E may be a timely response to a later ad notice. In an example, VCPU 180C continues notice translations and response translations as the notices and responses are queued for translation by VCPUs 180A and 180B respectively.

In an example, while VCPU 180C is translating responses 320D—in response translations 360D-E, VNIC 187B may receive three further responses in the form of responses 320G-I, which trigger interrupt 340D on VCPU 180B, which executes to process responses 320G-I in process responses 345GHI. In an example, VCPU 180A then continues background processing 337B after executing process notices 335BC, which is again interrupted when VNIC 187A receives notice 310D triggering interrupt 330C on VCPU 180A, which executes to process notice 310D in process notice 335D. In an example, each interrupt results in some lost processing time to context switching. In an example, after response translation 360D, VCPU 180C may begin notice translations for notices 310B-C. In an example, VCPU 180C may execute a context switch between notice translations and response translations (e.g., between response translation 365B and notice translation 350A).

In an example, FIG. 3 illustrates a break in time after notices 310B-C are received by VNIC 187A, VCPU 180A performs process notices 335BC, VCPU 180C performs response translation 360D, VCPU 180B performs process responses 345GHI, and VNIC 187B receives responses 320 GHI. In an example, the illustrated break may represent a break of 100 ms to 250 ms, during which time the ad requests resulting from notice translations 350A-B have returned from advertisers 155 and 157 in the form of responses 325A-B. In an example, responses 325A-B received by VNIC 187B trigger interrupt 340E on VCPU 180B, which executes to process responses 325A-B in process responses 347AB. In an example, VCPU 180C may then translate the responses 325A-B in response translations 355A-B, after which the resulting ad offers may be sent back to publisher 150 through VNIC 187A. In an example, while VNIC 187B, VCPU 180B, and VCPU 180C are waiting for and handling responses 325A-B, VNIC 187A may receive notice 310D, triggering interrupt 330C on VCPU 180A, displacing background process 337B from VCPU 180A as a context switch to process notice 310D in process notice 335D. Meanwhile, VNIC 1878B may receive additional responses 320J-K for previous requests, triggering interrupt 340F on VCPU 180B. In an example, responses 320J-K may not be timely. In another example, due to various optimizations, response 320J and/or response 320K may still be timely even after an extra 100 ms of delay.

Figure 4:
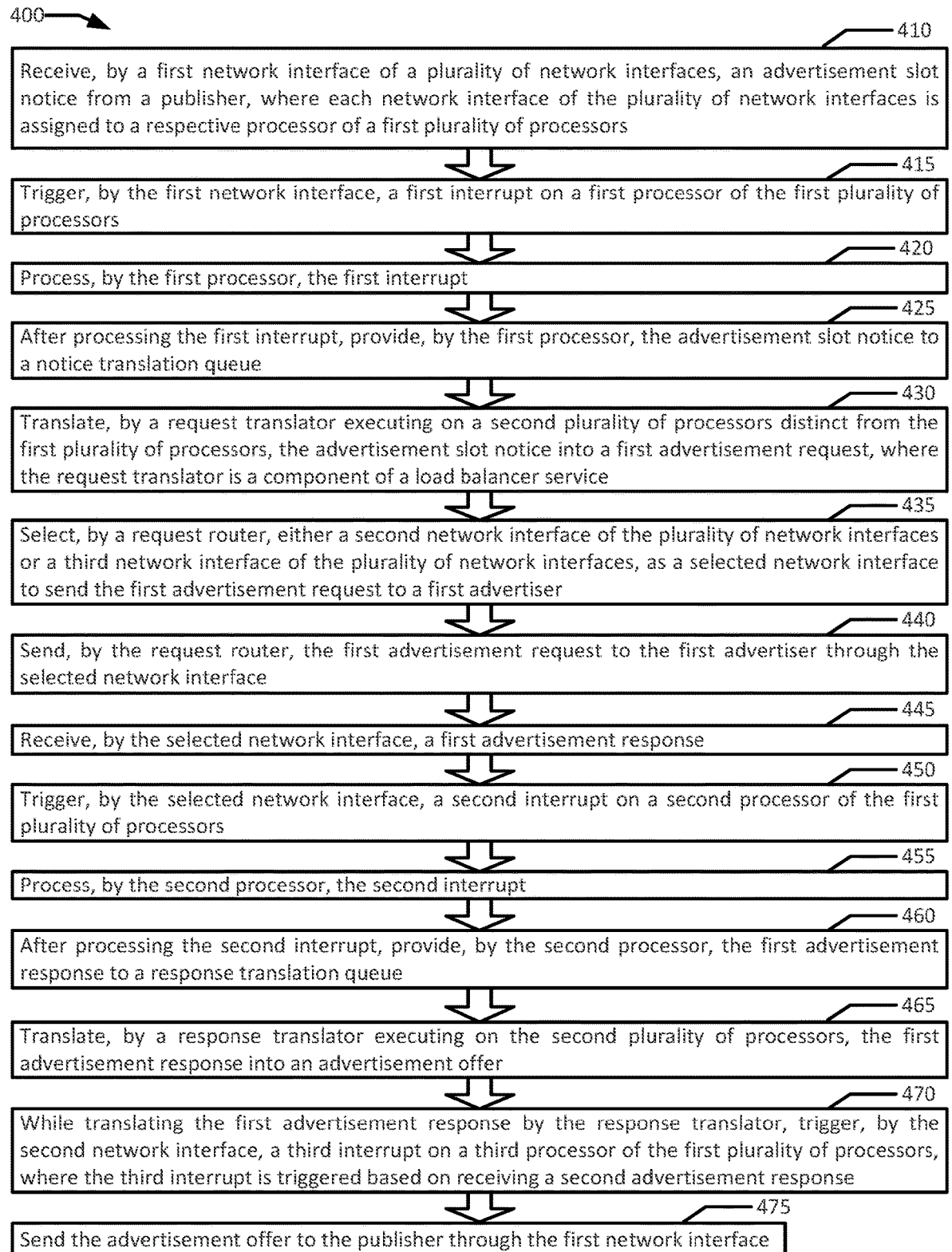
FIG. 4 is a flowchart illustrating efficient translation and load balancing of bid requests according to an example of the present disclosure.

FIG. 4 is a flowchart illustrating efficient translation and load balancing of bid requests according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method is performed by a load balancer system 200 illustrated in FIG. 2.

A first network interface of a plurality of network interfaces receives an advertisement slot notice from a publisher, where each network interface of the plurality of network interfaces is assigned to a respective processor of a first plurality of processors (block 410). For example, VNIC 187A receives an ad slot notice from publisher 150, where VNIC 187A is part of a plurality of network interfaces (e.g., VNICs 187A-C), each of which is assigned to a processor of a first plurality of processors (e.g., VCPUs 180A-B). In an example, VNIC 187A is assigned to VCPU 180A, VNIC 187B is assigned to VCPU 187B, and VNIC 187C is also assigned to VCPU 187B. In an example, VNICs 187B and 187C are assigned to different cores of the same physical or virtual processor (e.g., VCPU 180B). In another example, VNIC 187C is assigned to a different VCPU 180G associated with VCPU 180A and 180B. In an example, VNIC 187C may be assigned to a plurality of processors (e.g., VCPU 180B and 180G) where the plurality of processors are separate from the processors performing translation (e.g., VCPU 180C). In an example, a plurality of ad slot notices may be received by VNIC 187A in a short time frame (e.g., 1 ms) and the ad slot notices may be queued in a publisher inbound queue 270. In an example, the depth and timing of the publisher inbound queue 270 may be configured to optimize several factors such as notice delay, number of interrupts, and likelihood of lost notices. In the example, if a notice arrives while the queue is full, a notice may be displaced from the queue. For example the oldest notice, the newest notice, or a random notice may be discarded, or a different heuristic may be implemented to determine which notices are retained. In an example, notices from certain publishers may be prioritized or deprioritized for retention. In another example, a priority value in an ad notice may influence retention where a queue overflows.

The first network interface triggers a first interrupt on a first processor of the first plurality of processors (block 415). In an example, VNIC 187A triggers interrupt 240 on VCPU 180A. In an example, interrupt 240 may be a command to process the network input for the ad slot notice received by VNIC 187A and to store the network input into local storage. In an example, a plurality of ad slot notices are in publisher inbound queue 270 and are processed in the same interrupt 240 as a package, sent together by VNIC 187A. In an example, the first processor (e.g., VCPU 180A) processes the first interrupt (e.g., interrupt 240) (block 420). In an example, after processing the first interrupt (e.g., interrupt 240), the first processor (e.g., VCPU 180A) provides the advertisement slot notice to a notice translation queue (e.g., notice translation queue 280) (block 425). In an example, notice translation queue 280 may be implemented with any form of suitable queue technology, for example, as a queue, a topic, a file, a database, or a registry.

A request translator executing on a second plurality of processors distinct from the first plurality of processors translates the advertisement slot notice into a first advertisement request, where the request translator is a component of a load balancer service (block 430). In an example, request translator 142 is a component of load balancer service 140, and request translator 142 executes on VCPU 180C, which is part of a separate plurality of processors from VCPUs 180A-B. In the example, request translator 142 translates the ad slot notice into a first ad request (e.g., an ad request targeted at advertiser 155). In an example, translating the ad slot notice from publisher 150 for consumption by advertiser 155 may include removing a header and/or adding an identifier to the ad slot notice. In an example, the ad slot notice may be in the form of an HTTP GET request (e.g., a URL including query string parameters), while advertiser 155 may preferentially accept requests in the form of an HTTP POST request (e.g., a request message with a JSON style payload for parameters associated with the request). In the example, advertiser 155 may respond to an HTTP POST request with an average latency of 100 ms, while advertiser 155 may respond to an HTTP GET request with an average latency of 150 ms. In an example, request translator 142 may additionally translate the ad slot notice into a second ad request (e.g., an ad request targeted at advertiser 157). In the example, a different header may be added and/or removed to translate the ad slot notice for advertiser 157 as compared to advertiser 155. In the example, the two translations (e.g., the two resulting ad requests) may be subsequently sent to advertiser 155 and advertiser 157 respectively. In an example, a plurality of translations of the ad slot notice may be made by request translator 142 and queued on a request routing queue 290. In an example, by executing on VCPU 180C the request translator is insulated from interrupts (e.g., interrupt 240) caused by VNIC 187A receiving new ad slot notices since those interrupts are directed to assigned VCPU 180A. In an example, the ad slot notice may be incompatible with a format acceptable to advertiser 155, therefore requiring translation into the ad request. In another example, the ad request may be a smaller package of data than the ad slot notice and save on network transmission time. In addition, the ad slot notice may be compatible with advertiser 150, but advertiser 150 may require more time to translate the ad slot notice into a preferred form than request translator 142. For example, advertiser 150 may send the ad slot notice to a second server for translation incurring an additional network cost (e.g., 15 ms) which may be a hundred times the time taken by request translator 142 to translate the ad slot notice into the ad request.

A request router selects either a second network interface of the plurality of network interfaces or a third network interface of the plurality of network interfaces, as a selected network interface to send the first advertisement request to a first advertiser (block 435). For example, request router 146 may select VNIC 187B or VNIC 187C to send the ad request to advertiser 155. In an example, VNICs 187B and 187C may belong to a plurality of VNICs, each of which may be selected as the selected network interface. In an example, the ad slot notice may include a prioritization value such as a timeout value or a priority rating. In an example, VNIC 187B and VNIC 187C may maintain active network connections with a plurality of advertisers (e.g., advertiser 155 and advertiser 157), and it may be advantageous to send ad requests to advertiser 155 through VNIC 187B instead of VNIC 187C. In an example, additional VNICs of VM 116 may maintain connections to additional advertisers not connected to VNIC 187B or VNIC 187C, either in addition to connections to advertisers 155 and 157 or instead of connections to advertiser 155 and/or advertiser 157. For example, VNIC 187B may be connected to a faster responding server of advertiser 155 than VNIC 187C. In an example, a high priority request (e.g., due to a low timeout value) may be sent through VNIC 187B to take advantage of the faster responding server of advertiser 155, but an alternative low priority request may be sent through VNIC 187C to avoid flooding the fast server with requests and slowing it down. In an example, request router 146 may separately re-select a selected network interface for each ad request in request routing queue 290, even for ad requests originating from the same ad slot notice. For example, VNIC 187B may have higher performance to advertiser 155 than VNIC 187C, while the opposite may be true for advertiser 157. In the example, request router 146 may select VNIC 187B for the ad request for advertiser 155, and VNIC 187C for the ad request for advertiser 157. In an example, ad requests in the request routing queue 290 may be prioritized by request router 146 based on a source publisher as well as based on timeout value.

In an example, request router 146 may execute on 180C with request translator 142 and/or response translator 144. In another example, request router 146 may execute on a separate processor of the second plurality of processors including VCPU 180C. In yet another example, processors of the first plurality of processors (e.g., VCPU 180A and 180B) may have sufficient availability between interrupts to handle the processing necessary for request router 146. For example, VCPU 180A may receive significantly less interrupts than VCPU 180B, and may therefore be used to execute request router 146. In an example, request router 146 may optimally execute away from a processor handling network interrupts (e.g., VCPU 180A and 180B).

The request router sends the first advertisement request to the first advertiser through the selected network interface (block 440). In an example, request router 146 sends the first ad request to the advertiser 155 through VNIC 187B. In the example, request router 146 may place the first ad request in an advertiser outbound queue 272 of the VNIC 187B, where the ad request may be packaged according to appropriate networking protocols for transmission. In an example, VNIC 187B may package multiple ad requests directed to the same advertiser 155 together before transmitting the package of ad requests together.

The selected network interface receives a first advertisement response (block 445). In an example, VNIC 187B subsequently receives a first ad response, for example, a response to the ad request sent to advertiser 155 from advertiser 155. In the example, an advertiser inbound queue 275 may first queue the first ad response before VNIC 187B sends the first ad response to VCPU 180B for processing. In an example, several ad responses may be sent to VCPU 180B from advertiser inbound queue 275 together for processing. In an example, the several ad responses may be from the same or different advertisers, and may be in response to the same or different ad slot notices.

The selected network interface triggers a second interrupt on a second processor of the first plurality of processors (block 450). In an example, by sending the first ad response to VCPU 180B, VNIC 187B triggers interrupt 245 is VCPU 180B. In an example, the ad slot notice may be translated into multiple ad requests to multiple advertisers, whose respective ad responses may return in a staggered fashion, resulting in multiple interrupts on VCPU 180B to handle the plurality of ad responses. In an example, some of the ad requests may also be sent through VNIC 187C. The second processor processes the second interrupt (block 455). After processing the second interrupt, the second processor provides the first advertisement response to a response translation queue (block 460). In an example, VCPU 180B processes interrupt 245 and adds the first ad response to response translation queue 285, along with any other ad responses included with the first ad response in interrupt 245.

A response translator executing on the second plurality of processors translates the first advertisement response into an advertisement offer (block 465). In an example, response translator 144 executing on VCPU 180C may translate the first ad response into an ad offer. In an example, the ad offer translation may be based on a format compatible with publisher 150. In an example, the ad response may be rejected by publisher 150 if transmitted directly without translation. In another example, the time spent on translating the ad response into the ad offer may be more than made up by time saved on network transmission to publisher 150. In an example, translating an ad response into the ad offer may include removing an element unsupported by publisher 150, adding a tracking element, altering a tracking element, and/or removing a header. In an example, tracking elements may enable improved reporting of ad delivery, pricing, and consumption statistics. In another example, an ad response may arrive after a time out value associated with the ad slot notice has already elapsed, and the ad response may be rejected. For example, the response translator 144 may check for the timeout value related to the ad response prior to translation and reject late responses where the timeout value has been exceeded. In an example, response translator 144 may translate an ad request with a timeout value closer to expiring or a request with a higher priority value before processing the first ad request in the response translation queue 285.

While translating the first advertisement response by the response translator, the second network interface triggers a third interrupt on a third processor of the first plurality of processors, wherein the third interrupt is triggered based on receiving a second advertisement response (block 470). In an example, while response translator 144 is translating the ad response into the ad offer, VNIC 187C may receive a separate ad response (e.g., an ad response to a previous ad slot notice or an ad response from advertiser 157 for the same ad slot notice). VNIC 187C may then trigger an interrupt in VCPU 180G to process the new ad response. In the example, response translator 144 is not interrupted because VNICs 187B and 187C are configured and/or assigned to VCPUs 180B and 180G, and therefore interrupts from VNICs 187B and 187C do not interrupt VCPU 180C executing response translator 144.

The advertisement offer is sent to the publisher through the first network interface (block 475). In an example, after translating the first ad response into an ad offer, the ad offer is sent to publisher 150 through VNIC 187A. In an example, the ad offer may first be queued in publisher outbound queue 278 in VNIC 187A, and potentially be packaged with other ad offers before being transmitted to publisher 150.

In an example, each of publisher inbound queue 270, notice translation queue 280, request routing queue 290, advertiser outbound queue 272, advertiser inbound queue 275, response translation queue 285, and publisher outbound queue 278 may be configured for attributes such as queue depth, transmission packet size, and transmission frequency. In an example, if a queue overflows, messages may be lost. However, the size of a queue may impact loading times to and from memory as well as the timeliness of messages. For example, a high transmission frequency may defeat the purpose of having a large queue. However, a low transmission frequency with a large queue may result in frequent delays to messages that are counterproductive to optimizing latency through the load balancer system. In an example, optimization of attributes for each queue may involve iterative testing.

Figure 5:
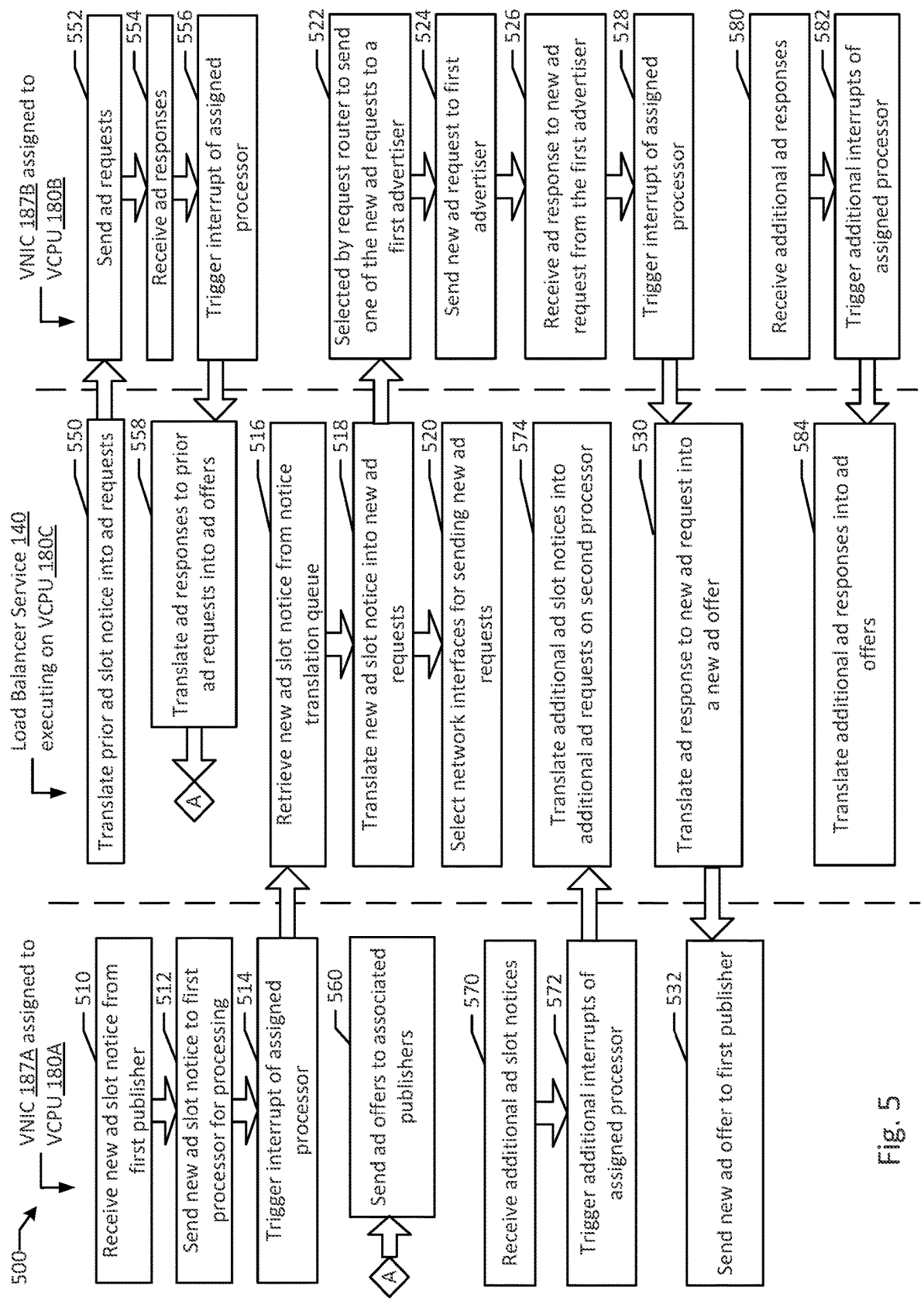
FIG. 5 is a flow diagram illustrating a system performing efficient translation and load balancing of bid requests according to an example of the present disclosure.

FIG. 5 is a flow diagram illustrating a system performing efficient translation and load balancing of bid requests according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 500, a VNIC 187A assigned to VCPU 180A, a VNIC 187B assigned to VCPU 180B, and a load balancer service 140 executing on VCPU 180C handle a plurality of ad slot notices and resulting ad offers.

In system 500 as illustrated in FIG. 5, the processing of a particular request/response cycle is shown along with additional intervening actions by VNIC 187A, VNIC 187B, and load balancer service 140 (e.g., blocks 510-532 vs. blocks 550-560, blocks 570-574, and blocks 580-584). In an example, VNIC 187A assigned to VCPU 180A receives a new ad slot notice from publisher 150 (block 510). In an example, VNIC 187A sends the new ad slot notice to VCPU 180A for processing (block 512). In the example, VNIC 187A triggers an interrupt of assigned processor VCPU 180A (block 514). As a result of the processing by VCPU 180A, the ad slot notice may be added to a notice translation queue 280. In an example, load balancer service 140, and more specifically request translator 142 executing on VCPU 180C, may retrieve the new ad slot notice from the notice translation queue 280 (block 516). Request translator 142 may then translate the new ad slot notice into new ad requests (block 518). In an example, request router 146 may select network interfaces for sending the new ad requests, including selecting VNIC 187B for sending one of the new ad requests to advertiser 155 (block 520). A request router 146 of load balancer service 140 may then select VNIC 187B to send one of the new ad requests to advertiser 155 (block 522). In an example, VNIC 187B sends the new ad request to advertiser 155 (block 524). VNIC 187B then subsequently receives an ad response to the new ad request from advertiser 155 (block 526). VNIC 187B may then trigger an interrupt of assigned processor VCPU 180B (block 528). In an example, load balancer service 140 and specifically response translator 144 executing on VCPU 180C may translate the ad response to the new ad request into a new ad offer (block 530). VNIC 187A may then receive the new ad offer and send the new ad offer to publisher 150 (block 532).

In an example, request translator 142 may translate a prior ad slot notice into ad requests (block 550). The requests may be sent to publishers by VNIC 187B (block 552), which may then receive ad responses to those requests (block 554). In an example, VNIC 187B may trigger a plurality of interrupts on assigned VCPU 180B (block 556). In an example the interrupts on VCPU 180B from the prior request may be triggered concurrently with the new ad slot notice being received from publisher 150 in block 510. In an example, response translator 144 may translate the ad responses to the prior ad slot notice into ad offers (block 558). In an example, response translator 144 may execute on VCPU 180C, such that the interrupt triggered on VCPU 180A in block 514 and the interrupts triggered on VCPU 180B in block 556 do not interrupt the translation in block 558. In an example, ad offers from prior ad slot notices are sent to respective publishers by VNIC 187A (block 560). In an example, VNIC 187A may send ad offers to prior ad slot notices concurrently with request translator 142 translating the new ad slot notice in block 518. In an example, prior to VNIC 187B receiving the ad response to the new ad request from advertiser 155 in block 526, VNIC 187A may receive additional ad slot notices (block 570). In an example, these additional ad slot notices trigger additional interrupts of assigned VCPU 180A (block 572). In an example, the additional interrupts of VCPU 180A are isolated away from VCPU 180C executing request translator 142 and response translator 144, thereby allowing request translator 142 to translate the additional ad slot notices into additional ad requests on VCPU 180C without interruption (block 574). In an example, VNIC 187B may continue to receive additional ad responses to various ad slot notices (block 580). In the example, additional interrupts of assigned VCPU 180B are triggered to process the ad responses (block 582). In the example, response translator 144 executes on VCPU 180C to translate the additional ad responses into ad offers (block 584). Response translator 144 may translate without interruption since processing network input from VNICs 187A-B are assigned to VCPUs 180A-B respectively.

By practicing efficient translation and load balancing of bid requests as advantageously described herein, for example, 50 ms in response latency may be removed from a typical 200 ms response cycle. This 25% performance boost yields extra dividends in terms of shifting the curve for bid processing times, such that a significantly lower proportion of bids end up triggering timeouts. For example, implementing efficient translation and load balancing of bid requests may reduce requests that time out from 15-20% to 10% on average. In an example, high priority requests with lower timeout values may see a larger benefit. Response times may typically resemble a positive skew distribution, with a small percentage of outliers that are lost and never respond. By shifting the mean and/or median response time by 50 ms to the left on such a curve, the right side tail of the curve exceeding a cut off timeout value for responding to a given ad slot notice is greatly reduced, therefore increasing efficiency and effectiveness. In addition, a large part of the latency saving result from an even greater efficiency savings of reducing the number of servers required for load balancing and translation by up to 90%. By allowing translation, inbound notice handling, and outbound request handling to occur on the same system, without the system being negatively impacted by network interrupts, much higher throughput and utilization rates are achievable, providing for an improvement in computer technology, specifically for high speed and high efficiency routing and translation of network transmitted information that was previously unachievable.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A load balancer system that insulates request and response translation from network interrupts, comprising:
   a first plurality of processors and a second plurality of processors distinct from the first plurality of processors;
   a plurality of network interfaces associated with the first plurality of processors including a first network interface, a second network interface, and a third network interface, wherein each network interface of the plurality of network interfaces is assigned to a respective processor of the first plurality of processors;
   a load balancer service including, a request translator, a response translator, and a request router, wherein the load balancer service executes on the second plurality of processors;
   the load balancer system executing to:
      receive, by the first network interface, an advertisement slot notice from a publisher;

trigger, by the first network interface, a first network interrupt on a first processor of the first plurality of processors;

process, by the first processor, the first network interrupt;

after processing the first network interrupt, provide, by the first processor, the advertisement slot notice to a notice translation queue;

translate, by the request translator, the advertisement slot notice into a first advertisement request;

select, by the request router, one of the second network interface and the third network interface as a selected network interface to send the first advertisement request to a first advertiser;

send, by the request router, the first advertisement request to the first advertiser through the selected network interface;

receive, by the selected network interface, a first advertisement response;

trigger, by the selected network interface, a second network interrupt on a second processor of the first plurality of processors;

process, by the second processor, the second network interrupt;

after processing the second interrupt, provide, by the second processor, the first advertisement response to a response translation queue;

translate, by the response translator, the first advertisement response into an advertisement offer;

while translating the first advertisement response by the response translator, trigger, by the second network interface, a third network interrupt on a third processor of the first plurality of processors that isolates the response translator from network triggered interrupts, wherein the third network interrupt is triggered based on receiving a second advertisement response; and send the advertisement offer to the publisher through the first network interface.

2. The system of claim 1, wherein a plurality of advertisement requests are sent to a plurality of advertisers based on the advertisement slot notice.

3. The system of claim 2, wherein a plurality of advertisement responses are received from the plurality of advertisers in response to the plurality of advertisement requests, triggering a plurality of network interrupts on the first plurality of processors.

4. The system of claim 3, wherein executing on the second plurality of processors insulates the request translator and the response translator from the plurality of network interrupts.

5. The system of claim 1, wherein a plurality of advertisement slot notices are queued first in the first network interface before being sent to the first plurality of processors as a package, which triggers a single network interrupt in the first plurality of processors.

6. The system of claim 1, wherein translating from the advertisement slot notice into the first advertisement request includes at least one of a removal of a header and an addition of an identifier.

7. The system of claim 6, wherein the advertisement slot notice is translated into a second advertisement request different from the first advertisement request.

8. The system of claim 7, wherein the second advertisement request is sent to a second advertiser.

9. The system of claim 1, wherein the advertisement slot notice includes a prioritization value.

10. The system of claim 9, wherein the prioritization value includes a timeout value.

11. The system of claim 10, wherein the response translator rejects the first advertisement response based on the timeout value being exceeded.

12. The system of claim 9, wherein the request router selects one of the second network interface and the third network interface as the selected network interface based on the prioritization value.

13. The system of claim 1, wherein translating the first advertisement response into the advertisement offer includes at least one of removing an unsupported element, adding a tracking element, altering the tracking element, and removing a header.

14. The system of claim 1, wherein the request translator sends a plurality of advertisement requests to a request routing queue.

15. The system of claim 14, wherein the request router selects one of the second network interface and the third network interface to send each of the plurality of advertisement requests in the request routing queue.

16. The system of claim 1, wherein the second network interface and the third network interface maintain a plurality of active connections to a plurality of advertisers including the first advertiser and a second advertiser.

17. The system of claim 16, wherein a fourth network interface maintains an active connection to a third advertiser apart from the plurality of advertisers.

18. A method of load balancing a first plurality of processors and a second plurality of processors distinct from the first plurality of processors that insulates request and response translation from network interrupts, wherein the first plurality of processors is associated with a plurality of network interfaces and the second plurality of processors is associated with a load balancer service, the load balancer service including a request translator, a response translator, and a request router, the method comprising:

receiving, by a first network interface of the plurality of network interfaces, an advertisement slot notice from a publisher, wherein each network interface of the plurality of network interfaces is assigned to a respective processor of the first plurality of processors;

triggering, by the first network interface, a first network interrupt on a first processor of the first plurality of processors;

processing, by the first processor, the first network interrupt;

after processing the first network interrupt, providing, by the first processor, the advertisement slot notice to a notice translation queue;

translating, by the request translator executing on the second plurality of processors, the advertisement slot notice into a first advertisement request;

selecting, by the request router, one of a second network interface of the plurality of network interfaces and a third network interface of the plurality of network interfaces, as a selected network interface to send the first advertisement request to a first advertiser;

sending, by the request router, the first advertisement request to the first advertiser through the selected network interface;

receiving, by the selected network interface, a first advertisement response;

triggering, by the selected network interface, a second network interrupt on a second processor of the first plurality of processors;

processing, by the second processor, the second network interrupt;

after processing the second network interrupt, providing, by the second processor, the first advertisement response to a response translation queue;

translating, by the response translator executing on the second plurality of processors, the first advertisement response into an advertisement offer;

while translating the first advertisement response by the response translator, triggering, by the second network interface, a third network interrupt on a third processor of the first plurality of processors that isolates the response translator from network interrupts, wherein the third network interrupt is triggered based on receiving a second advertisement response; and sending the advertisement offer to the publisher through the first network interface.

19. A computer-readable non-transitory storage medium storing executable instructions of load balancing that insulates request and response translation from network interrupts, which when executed by a computer system, cause the computer system to:

receive, by a first network interface of a plurality of network interfaces, an advertisement slot notice from a publisher, wherein each network interface of the plurality of network interfaces is assigned to a respective processor of a first plurality of processors;

trigger, by the first network interface, a first network interrupt on a first processor of the first plurality of processors;

process, by the first processor, the first network interrupt;

after processing the first network interrupt, provide, by the first processor, the advertisement slot notice to a notice translation queue;

translate, by a request translator executing on a second plurality of processors distinct from the first plurality of processors, the advertisement slot notice into an advertisement request, wherein the request translator is a component of a load balancer service and is isolated from network interrupts that are generated in response to advertisement slot notices and advertisement responses;

select, by a request router, one of a second network interface of the plurality of network interfaces and a third network interface of the plurality of network interfaces, as a selected network interface to send the advertisement request to an advertiser;

send, by the request router, the advertisement request to the advertiser through the selected network interface;

receive, by the selected network interface, a first advertisement response;

trigger, by the selected network interface, a second network interrupt on a second processor of the first plurality of processors;

process, by the second processor, the second network interrupt;

after processing the second network interrupt, provide, by the second processor, the first advertisement response to a response translation queue;

translate, by a response translator executing on the second plurality of processors, the first advertisement response into an advertisement offer;

while translating the first advertisement response by the response translator, trigger, by the second network interface, a third network interrupt on a third processor of the first plurality of processors isolated from the response translator, wherein the third network interrupt is triggered based on receiving a second advertisement response; and send the advertisement offer to the publisher through the first network interface.

* * * * *